United States Patent [19]

Mahrus et al.

[11] Patent Number: 4,545,913
[45] Date of Patent: Oct. 8, 1985

[54] PLAIN BEARINGS

[75] Inventors: Duraid Mahrus; Peter Bredemann, both of Sao Paulo, Brazil

[73] Assignee: Metal Leve S.A. Industria e Comercio, Brazil

[21] Appl. No.: 535,376

[22] Filed: Sep. 23, 1983

[51] Int. Cl.[4] ............................................. C10M 7/02
[52] U.S. Cl. ................................... 252/12.6; 252/12.4
[58] Field of Search ...................... 252/12, 12.2, 12.4, 252/12.6

[56] References Cited

U.S. PATENT DOCUMENTS 3,623,981 11/1971 Giltrow et al. ..................... 252/12.2
3,674,689 7/1972 Giltrow et al. ..................... 252/12.4
3,756,925 9/1973 Takeuchi et al. .................. 252/12.2
4,312,772 1/1982 Mori ................................... 252/12.2

Primary Examiner—Jacqueline V. Howard
Attorney, Agent, or Firm—Darby & Darby

[57] ABSTRACT

A plain bearing of the trimetal type wherein the antifriction layer is of an alloy with a Pb-Sn-Cu base, having a copper content from 2 to 6% by weight, a tin content from 8 to 13% by weight and the remainder being lead, the said alloy being added with an amount of carbon fibers, the alloy and carbon fibers being electrochemically deposited. The carbon fibers exhibit a random arrangement within the metal matrix and the fiber tips emerging from the alloy are embedded in the adjoining layer.

9 Claims, No Drawings

PLAIN BEARINGS

The present invention relates to plain bearings especially for internal combustion engines, its object being applicable also to bushings and thrust washers. The invention primarily relates to plain bearings of the type known as trimetal bearings which are composed of a steel back, and intermediate layer (usually copper-based alloys or aluminum alloys) applied thereto, and an antifriction layer electrodeposited on the previously finished surface of the intermediate layer. Generally, the antifriction layer is a 25 μm thick Pb-Sn-Cu alloy which most known composition by weight is 2.5% Cu, 10% Sn and the remainder Pb. This antifriction layer imparts the properties of conformability and embeddability as well as resistance to corrosion required for a satisfactory performance of the bearing. Between the intermediates layer and the antifriction layer is a layer of nickel which operates as a barrier to prevent the diffusion of tin from the antifriction layer to the intermediate layer. The antifriction layer deposited by the electrochemical method is the portion of the bearing subjected to the highest demands. Ideally this layer should remain undamaged over the engine service life. In practice, however, this layer often fails during engine operation and accounts in some instances for the opening of the engine for replacement of the bearings. The problem is further aggravated by the growing tendency toward an increase of the engine power/weight ratio which impose consistently higher demands on engine parts, in particular on the bearings, which become therefore the most critical component. The main factors causing the antifriction layer to fail can be defined as the following:

Wear, which is represented by the removal of low hardness material, especially lead. Under normal use and lubrication conditions wear of the bearing antifriction layer is comparable to that of other engine components.

The second factor is fatigue which is characterized by cracks developed by alternating loads which work down toward the underlying layer—in the case of trimetal bearings, the nickel barrier. When the cracks come close to the interface their propagation changes direction and develops parallel to the interface, thereby causing pieces of the antifriction layer to break loose from the bearing and be carried away by the lubricating oil stream.

A third factor indicing failure of the antifriction layer is errosion which causes a washing away of the layer surface thus leaving the nickel barrier exposed.

This removal, however, is limited to localized and well defined areas, leaving most of the antifriction layer undamaged. A study of the erosion phenomenon discloses several mechanisms which may be grouped in two main categories, namely:

Flow erosion which, owing to bearing design features, causes the oil flow to develop at certain regions a condition of turbulence which with the presence of particles in suspension in the lubricant has a highly detrimental effect on the antifriction layer. This type of erosion is sometimes designated impact erosion.

Cavitation erosion. This phenomenon originates from variations in the oil pressure creating fluid pressures falling below vapor pressure at a given temperature, thereby causing vapor bubbles to form in the lubricating oil. When the vapor bubbles collapse, they may lead to extremely high localized pressures which will result in localized fatigue.

It is an object of the present invention to improve the structural resistance of the electrodeposited antifriction layer by means of the use of carbon fibers as a reinforcing material with a view to reducing the effects of the aforementioned damaging mechanisms. According to the invention there is provided a plain bearing having an antifriction layer of a Pb-Sn-Cu alloy to which a certain amount of carbon fibers is added, the said alloy and carbon fibers to be electrochemically deposited. The copper content of the alloy is from 2 to 6% by weight, the tin content is 8 to 13% by weight, the remainder being lead. The carbon fibers diameter is less than 7 μm and fiber length is preferably from 0.025 to 2 mm. The carbon fibers provide a structure in which the fibers are arranged randomly in the layer and present a required degree of bond strength between their outer surface and the alloy in which they are embedded. The embeddability in electrodeposits of particles in suspension in the electrolytic solution (as a rule an undesirable and detrimental phenomenon) is of advantage in carrying out the process, as in the case of the invention the carbon fibers are codeposited with the alloy bath. For application in trimental bearings, one preferred embodiment provides the addition for an amount of carbon fibers to a nickel bath which will be deposited on the intermediate layer. Once deposited, the nickel layer will exhibit a surface having a large number of fiber ends emerging from the layer. These fiber tips will become embedded in the next layer, i.e, a Pb-Sn-Cu alloy electrodeposited.

In a second alternative embodiment, an amount of carbon fibers is added to the Pb-Sn-Cu bath only, which is then deposited on the nickel layer.

In a third embodiment the nickel bath is added with a carbon fiber charge. As in the first embodiment, the nickel layer will exhibit a surface having fiber tips emerging thereof which will be embedded in the next electrodeposit, a Pb-Sn-Cu bath which has been also added with carbon fibers.

The addition of carbon fibers to plain bearing antifriction layers affords a substantial improvement to their mechanical properties by imparting a significant resistance to wear, fatigue and erosion to said layers. Furthermore, owing to their graphitic character the carbon fibers provide good sliding properties at the surfacing points.

What is claimed is:

1. A plain bearing comprising:
   a steel back;
   an intermediate layer adjacent to said steel back;
   a nickel layer adjacent to said intermediate layer; and
   an antifriction layer adjacent to said nickel layer, said antifriction layer comprising a Pb-Sn-Cu alloy added with a charge of carbon fibers having diameters of less than 7 μm and lengths ranging from 0.025 mm to 2 mm, the alloy and the carbon fibers being electrodeposited simultaneously on the nickel layer.

2. A plain bearing as defined in claim 1 wherein the alloy has a copper content from 2 to 6% by weight, a tin content from 8 to 13% by weight the remainder being lead.

3. A plain bearing as defined in claim 1 wherein the carbon fibers are arranged at random within the metal matrix.

4. A plain bearing comprising:

a steel back;

an intermediate layer adjacent to said steel back;

a nickel layer adjacent to said intermediate layer, said nickel layer including carbon fibers which have been simultaneously electrodeposited along with a nickel bath onto said intermediate layer so that fiber ends emerge from the nickel layer after electrodeposition; and an antifriction layer deposited onto said nickel layer so that the emergent fiber ends of the nickel layer are embedded in the antifriction layer, said antifriction layer comprising a Pb-Sn-Cu alloy.

5. A plain bearing as set forth in claim 4, wherein the Pb-Sn-Cu alloy has a copper content ranging from 2 to 6% by weight, a tin content ranging from 8 to 13% by weight, the remainder being lead.

6. A plain bearing as set forth in claim 4, wherein the carbon fibers have diameters of less than 7 μm and lengths ranging from 0.025 mm to 2 mm.

7. A plain bearing as set forth in claim 4, said antifriction layer further comprising a second charge of carbon fibers, the alloy and the second charge of fibers being simultaneously electrodeposited on the nickel layer.

8. A plain bearing as set forth in claim 7, wherein the Pb-Sn-Cu alloy has a copper content ranging from 2 to 6% by weight, a tin content ranging from 8 to 13% by weight, the remainder being lead.

9. A plain bearing as set forth in claim 7, wherein the carbon fibers of the charge added to the nickel layer and of the second charge added to said antifriction layer have diameters of less than 7 μm and lengths ranging from 0.025 mm to 2 mm.

* * * * *